US012467152B2

(12) United States Patent
Hatchett et al.

(10) Patent No.: US 12,467,152 B2
(45) Date of Patent: Nov. 11, 2025

(54) LITHIUM RECOVERY FROM LITHIUM SALTS DISSOLVED IN IONIC LIQUIDS

(71) Applicant: THE BOARD OF REGENTS OF THE NEVADA SYSTEM OF HIGHER EDUCATION ON BEHALF OF THE UNIVERSITY OF NEVADA, Las Vegas, NV (US)

(72) Inventors: David W. Hatchett, Las Vegas, NV (US); Cassara J. Higgins, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 583 days.

(21) Appl. No.: 17/795,646

(22) PCT Filed: Mar. 5, 2021

(86) PCT No.: PCT/US2021/021004
§ 371 (c)(1),
(2) Date: Jul. 27, 2022

(87) PCT Pub. No.: WO2021/178748
PCT Pub. Date: Sep. 10, 2021

(65) Prior Publication Data
US 2023/0072690 A1    Mar. 9, 2023

Related U.S. Application Data

(60) Provisional application No. 62/986,032, filed on Mar. 6, 2020.

(51) Int. Cl.
*C25C 1/22* (2006.01)
*C22B 3/20* (2006.01)
(Continued)

(52) U.S. Cl.
CPC . *C25C 1/22* (2013.01); *C25C 7/02* (2013.01)

(58) Field of Classification Search
None
See application file for complete search history.

(56) References Cited

U.S. PATENT DOCUMENTS 6,835,228 B1    12/2004  Lin
10,144,990 B2   12/2018  Bourassa et al.
(Continued)

FOREIGN PATENT DOCUMENTS

| CN | 103233246 A | 8/2013 |
| WO | 2014047347 A1 | 3/2014 |
| WO | 2018144480 A1 | 8/2018 |
| WO | 2018157203 A1 | 9/2018 |
| WO | 2020128619 A1 | 6/2020 |

OTHER PUBLICATIONS

Chinese Patent Office Notification of Decision of Rejection for Application No. 202180017780.9, dated Apr. 10, 2024 (14 pages with translation).
(Continued)

*Primary Examiner* — Yun Qian
(74) *Attorney, Agent, or Firm* — Michael Best & Friedrich LLP

(57) ABSTRACT

Described herein are methods for recovering lithium metal, lithium hydride, or lithium hydroxide from lithium salts by dissolving the lithium salt in ionic liquids and applying a current to the solution.

16 Claims, 12 Drawing Sheets

(51) Int. Cl.
  *C22B 59/00* (2006.01)
  *C25C 7/02* (2006.01)

(56) References Cited

U.S. PATENT DOCUMENTS

| | | |
|---|---|---|
| 10,422,048 B2 | 9/2019 | Hatchett et al. |
| 2014/0147330 A1* | 5/2014 | Lee .................... C25C 3/02 |
| | | 205/407 |
| 2015/0014184 A1 | 1/2015 | Swonger |
| 2017/0229737 A1 | 8/2017 | Seo et al. |
| 2017/0306514 A1 | 10/2017 | Hatchett et al. |
| 2018/0062206 A1 | 3/2018 | Yang et al. |

OTHER PUBLICATIONS

Chinese Patent Office Notification of Second Office Action for Application No. 202180017780.9, dated Dec. 27, 2023 (19 pages with translation).

International Search Report and Written Opinion for Application No. PCT/US21/21004 dated May 21, 2021 (8 pages).

Wang et al., "Recycling LiCoO2 with methanesulfonic acid for regeneration of lithium-ion battery electrode materials", J. Power Sources, 2019, vol. 436, 9 pages.

Saheb et al., "Reference Electrode for Ionic Liquids", Electroanalysis, 2006, vol. 18, No. 4, pp. 405-409.

Lide, CRC Handbook of Chemistry and Physics, 76th Ed, 1995, pp. 8-23.

European Patent Office. Extended European Search Report for application 21763800.6, dated Sep. 12, 2023 (8 pages).

Swain, B . . . "Recovery and recycling of lithium: A review." Separation and Purification Technology 172 (2017): 388-403.

Canadian Patent Office Action for Application No. 3,165,781, dated Aug. 8, 2023 (3 pages).

Chinese Patent Office Notification of First Office Action for Application No. 202180017780.9, dated Jul. 30, 2023 (19 pages with translation).

Canadian Patent Office Action for Application No. 3,165,781, dated Apr. 17, 2025 (3 pages).

* cited by examiner

LITHIUM RECOVERY FROM LITHIUM SALTS DISSOLVED IN IONIC LIQUIDS

CROSS REFERENCE TO RELATED APPLICATIONS

This application is a U.S. national stage entry of International Patent Application No. PCT/US2021/021004, filed on Mar. 5, 2021, which claims priority to U.S. Provisional Patent Application No. 62/986,032, filed on Mar. 6, 2020, which are incorporated by reference herein in their entirety.

FEDERALLY SPONSORED RESEARCH

This invention was made with United States government support under Department of Energy, Prime Contract number DE-NA-0003624, Subcontract No. 159313, Task Order No. 32. The United States government has certain rights in the invention.

TECHNICAL FIELD

Described herein are methods for recovering lithium metal, lithium hydride, or lithium hydroxide from lithium salts by dissolving the lithium salt in ionic liquids and applying a current to the solution.

BACKGROUND

Lithium ion batteries are rechargeable batteries that are used in many electronic devices. Lithium ion batteries use lithium ions ($Li^+$) as the positive electrically charged material. During discharge, lithium ions move from the negative electrode (typically graphite) through an electrolyte medium to the positive electrode (typically a metal oxide such as $CoO_2$). Upon re-charging, the lithium ions migrate back to the negative electrode.

Each year thousands of lithium ion batteries are discarded. These waste batteries contain lithium among other heavy metals and present serious concerns for environmental contamination. In addition, the costs associated with producing the lithium are wasted when the battery is discarded. What is needed is an efficient and economical method for recovering lithium from lithium ion batteries and other lithium containing articles.

SUMMARY

Described herein are methods for recovering lithium metal, lithium hydrides, or lithium hydroxides from lithium salts by dissolving the lithium salt in ionic liquids and applying a current to the solution. The process permits high concentrations of lithium ions (up to 7 M) be dissolved in the ionic liquid.

One embodiment described herein is a method for recovering lithium, comprising: combining a lithium salt and a nonaqueous acid to form a composition comprising the lithium salt and the nonaqueous acid; adding an ionic liquid to the composition to form an ionic liquid composition; and applying a potential to the ionic liquid composition to deposit lithium onto an electrode. In one aspect, the lithium salt and the nonaqueous acid are combined in water and then dehydrated prior to adding the ionic liquid. In another aspect, the ionic liquid composition is sparged with an inert gas to remove water and $CO_2$ from the ionic liquid composition. In another aspect, the inert gas is selected from argon, helium, neon, krypton, and xenon. In another aspect, the lithium salt is $Li_2CO_3$, LiCl, $LiPF_6$, $LiBF_4$, $LiClO_4$, $LiAsF_6$, or $LiCF_3SO_3$, or combinations thereof. In another aspect, the lithium concentration in the ionic liquid comprises about 0.1 M, 0.25 M, 0.5 M, 0.75 M, 1.0 M, 1.5 M, 2.0 M, 2.5 M, 3.0 M, 3.5 M, 4.0 M, 4.5 M, 5.0 M, 5.5 M, 6.0 M, 6.5 M, or 7.0 M. In another aspect, the anion of the ionic liquid and the anion of the nonaqueous acid comprise the same anionic moiety. In another aspect, the nonaqueous acid is n-bis (trifluoromethanesulfonylimide) acid (HTFSI). In another aspect, the ionic liquid comprises an n-bis(trifluoromethanesulfonylimide) (TFSI) anion. In another aspect, the ionic liquid comprises a cation that does not undergo reductive decomposition at a potential between −2.5 and −4.5 V. In another aspect, the ionic liquid comprises a cation selected from the group consisting of alkyl-substituted or unsubstituted ammonium cations; alkyl-substituted or unsubstituted piperidinium cations; or alkyl-substituted or unsubstituted pyrrolidinium cations. In another aspect, the ionic liquid comprises a cation selected from the group consisting of a tetraalkylammonium cation, a dialkylpiperidinium cation, and a dialkylpyrrolidinium cation. In another aspect, the ionic liquid comprises a cation selected from the group consisting of a butyltrimethylammonium cation; a 1-methyl-1-propylpiperidinium cation, and a 1-methyl-1-propylpyrrolidinium cation. In another aspect, the applied potential is between −3.2 and −4.0 volts. In another aspect, the applied potential is pulsed. In another aspect, the applied potential is constant. In another aspect, the lithium is deposited as lithium metal, lithium hydride, or lithium hydroxide. In another aspect, the electrode comprises carbon or gold.

Another embodiment described herein is lithium metal, lithium hydride, or lithium hydroxide recovered using any of the methods described herein.

Another embodiment described herein is a means for recovering lithium, the means comprising: combining a lithium salt and a nonaqueous acid to form a composition comprising the lithium salt and the nonaqueous acid; adding an ionic liquid to the composition to form an ionic liquid composition; and applying a potential to the ionic liquid composition to deposit lithium onto an electrode.

Another embodiment described herein is lithium metal, lithium hydride, or lithium hydroxide recovered using any of the means described herein.

DESCRIPTION OF THE DRAWINGS

FIG. 1A shows a photograph of lithium metal deposition from 1 M LiTFSI in 1-methyl-1-propylpiperidinium n-bis(trifluoromethylsulfonyl)imide ([MPPi][TFSI]) after 4 hours and after 20 hours (FIG. 4B) at an applied potential of −3.63 V vs Ag/AgCl (sat'd). FIG. 1C shows LiTFSI deposited on gold mesh after 24 hours at an applied potential of −3.63 V vs Ag/AgCl (sat'd). FIG. 1D shows the recovered lithium.

FIG. 10A, FIG. 10B, and FIG. 100 show photographs of lithium recovered from ionic liquids.

DETAILED DESCRIPTION

Figure 1A:
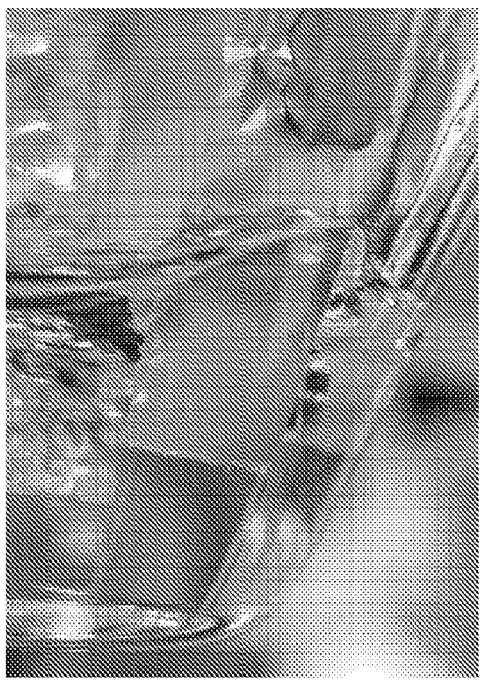
FIG. 1A-1D show the electrochemical recovery of lithium from an ionic liquid.
Figure 1B:
Figure 1C:
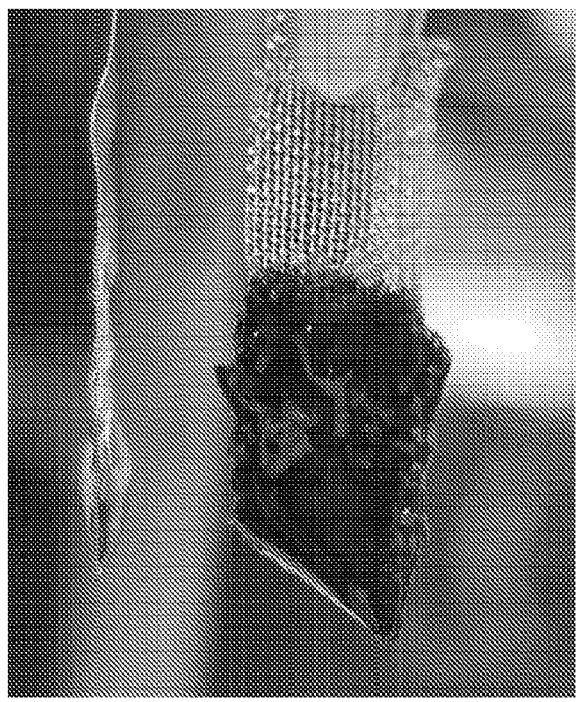
Figure 1D:
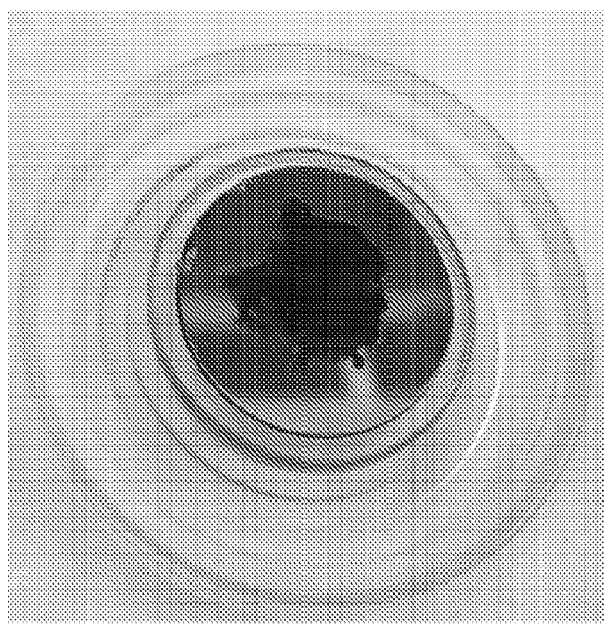
Figure 2:
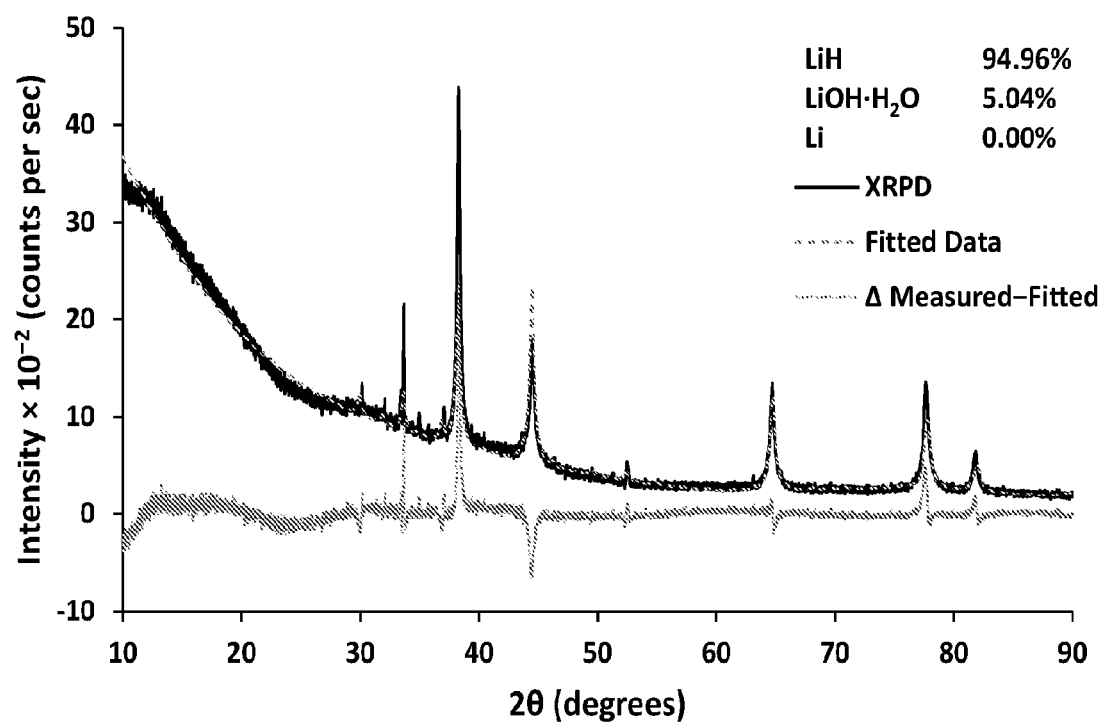
FIG. 2 shows an X-ray powder diffraction (XRPD) pattern of the lithium precipitate. The pattern shows that the precipitate consists of LiH and $LiOHH_2O$ and contains no metal.
Figure 3A:
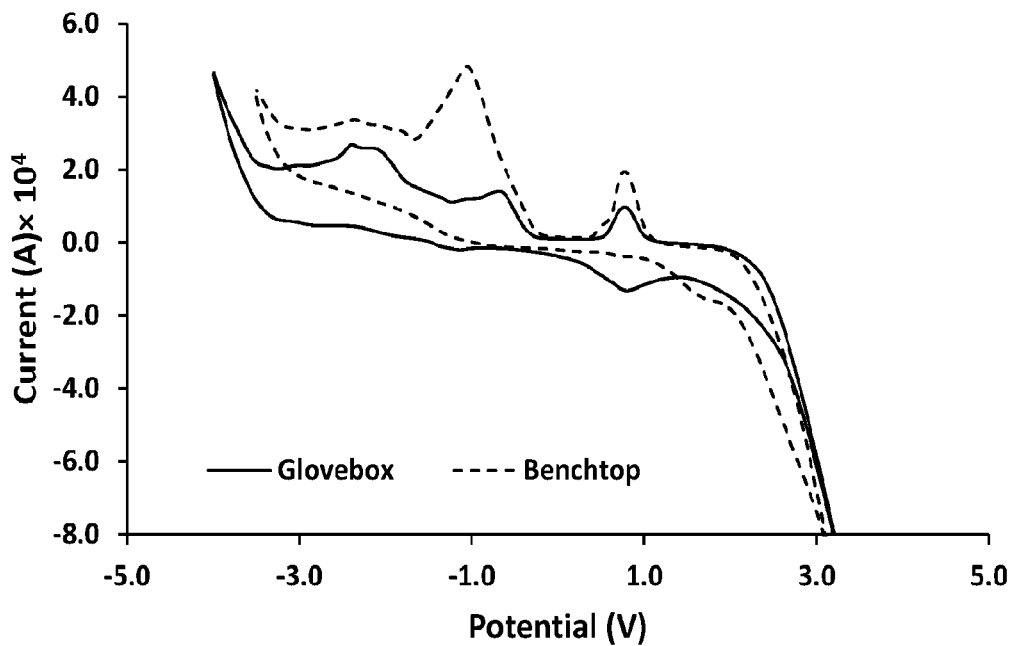
FIG. 3A shows the background cyclic voltammogram of the [MPPi][TFSI] with a gold electrode on the bench top (blue tracing) and in a glove box (red tracing).
Figure 3B:
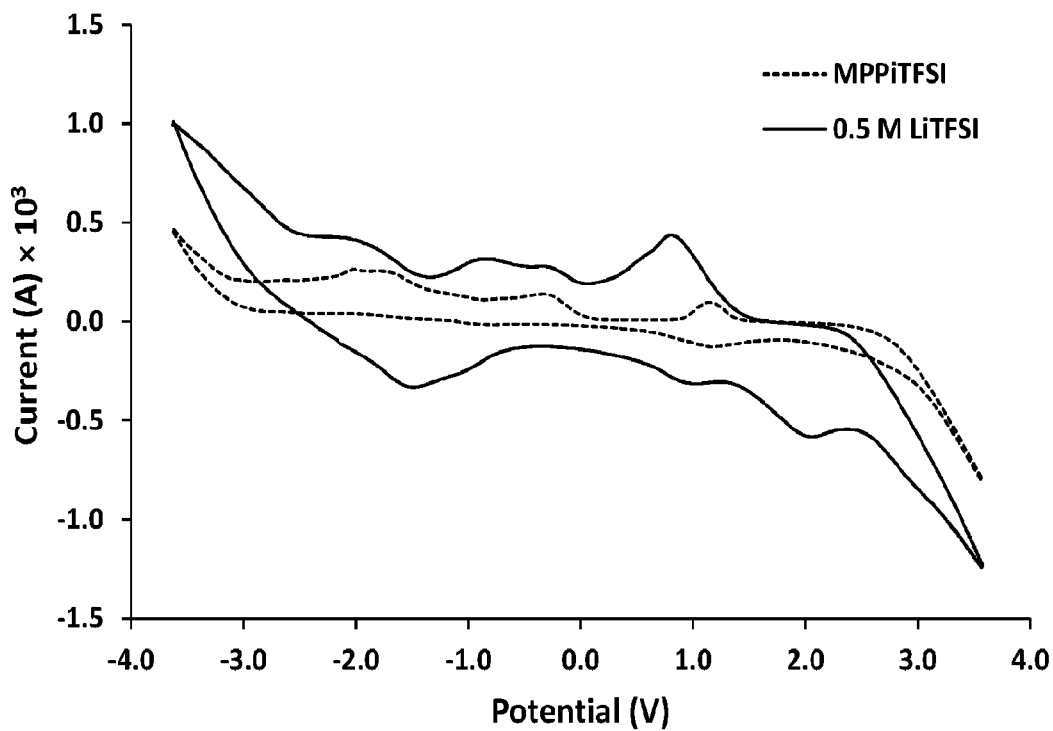
FIG. 3B shows a cyclic voltammogram of the clean [MPPi][TFSI] (red tracing) and 0.5 M LiTFSI (blue tracing) in a glove box.
Figure 4A:
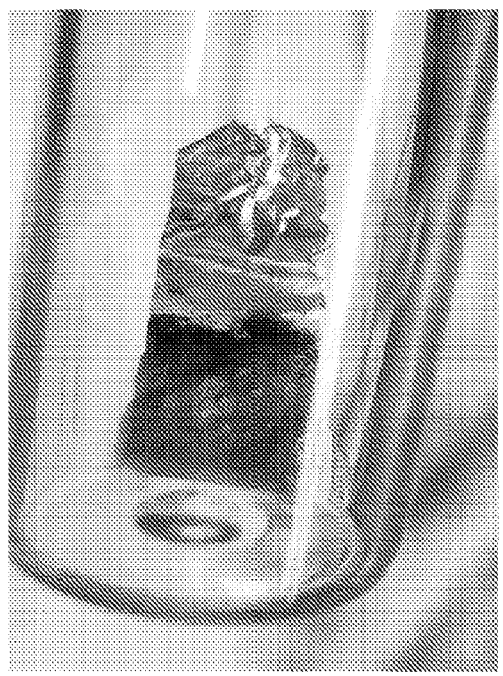
FIG. 4A shows photographs of lithium deposited on a gold electrode in a glove box after 40 hours at an applied potential of −4.0 V.
Figure 4B:
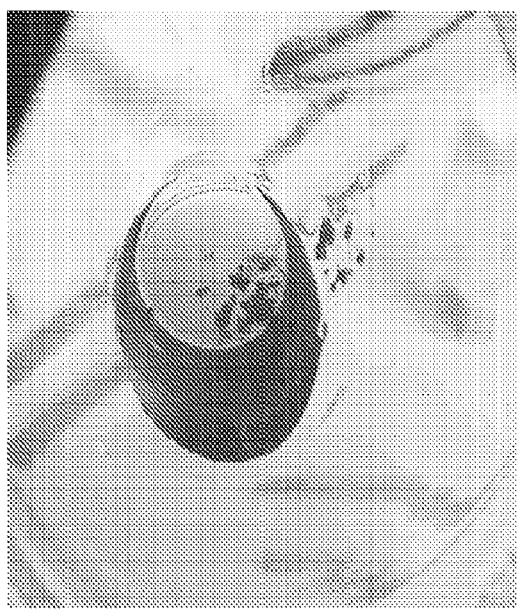
FIG. 4B shows the recovered lithium.
Figure 5A:
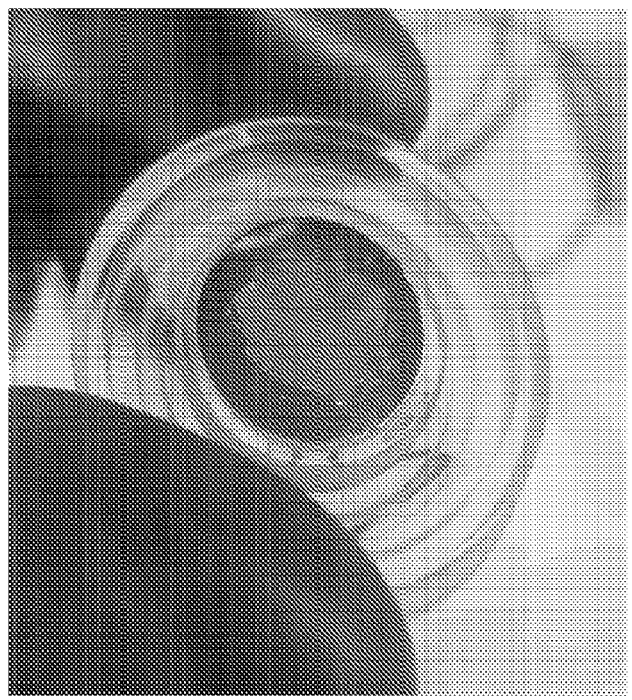
FIG. 5A and FIG. 5B show photographs of recovered lithium deposits before (FIG. 5A) and after (FIG. 5B) exposure to the atmosphere on an XRPD stage.
Figure 5B:
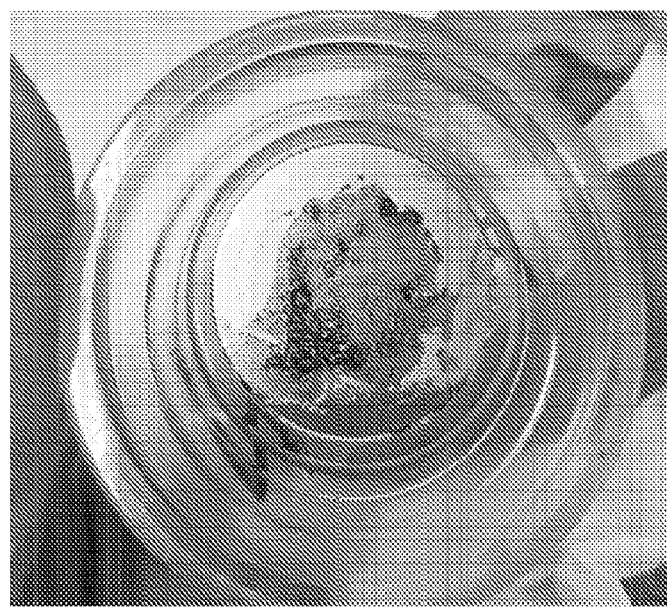
Figure 5C:
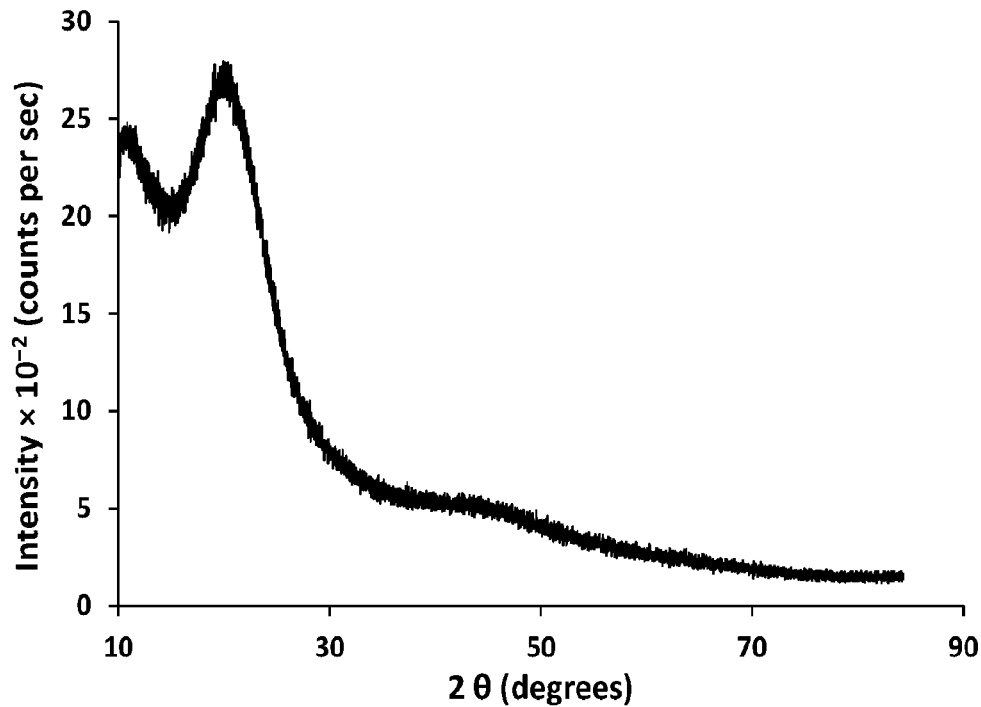
FIG. 5C shows the XRPD pattern for the lithium shown in FIG. 5A with no peaks and FIG. 5D is the pattern for the lithium shown in FIG. 5B after exposure to air. The pattern has peaks for LiH in red and LiOH in green.
Figure 5D:
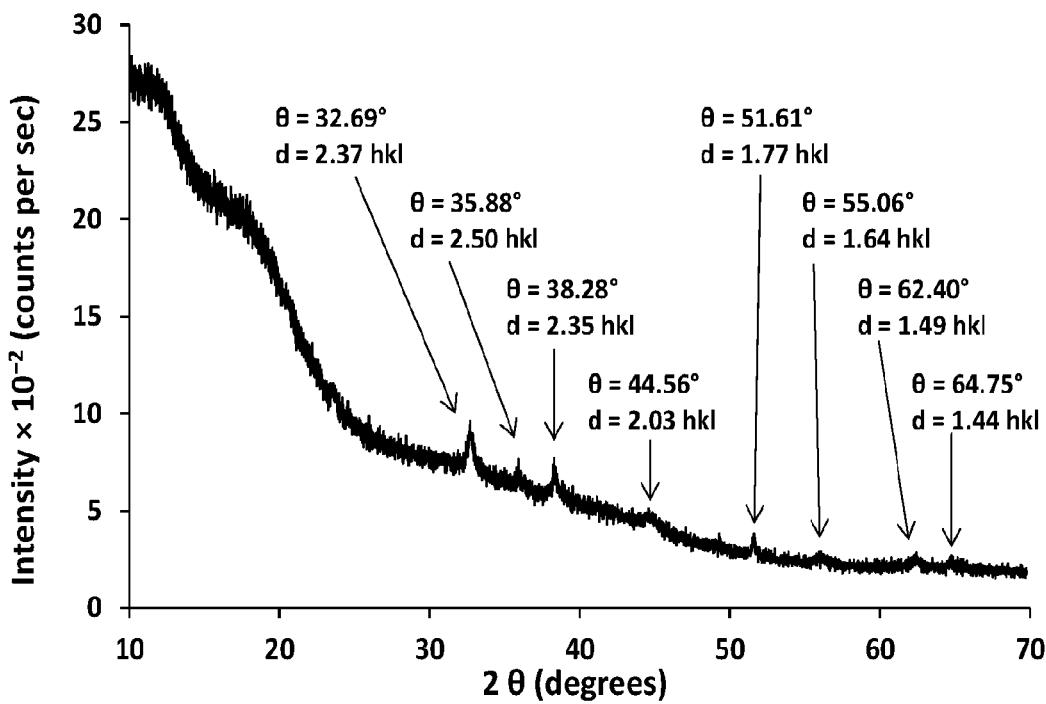
Figure 6A:
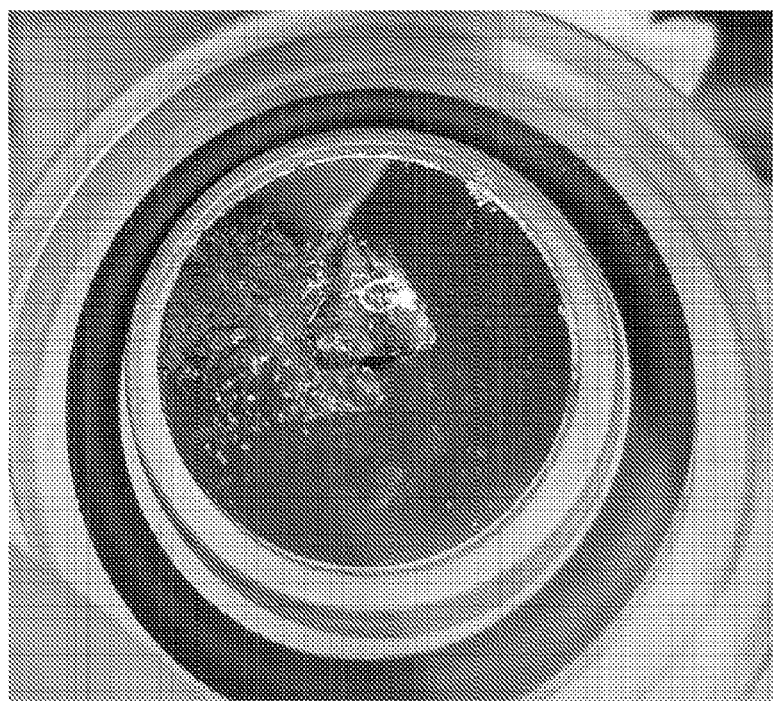
FIG. 6A is a photograph of the lithium deposits on a gold electrode that X-ray powder diffraction pattern was completed on after 44 hours at −4 V.
Figure 6B:
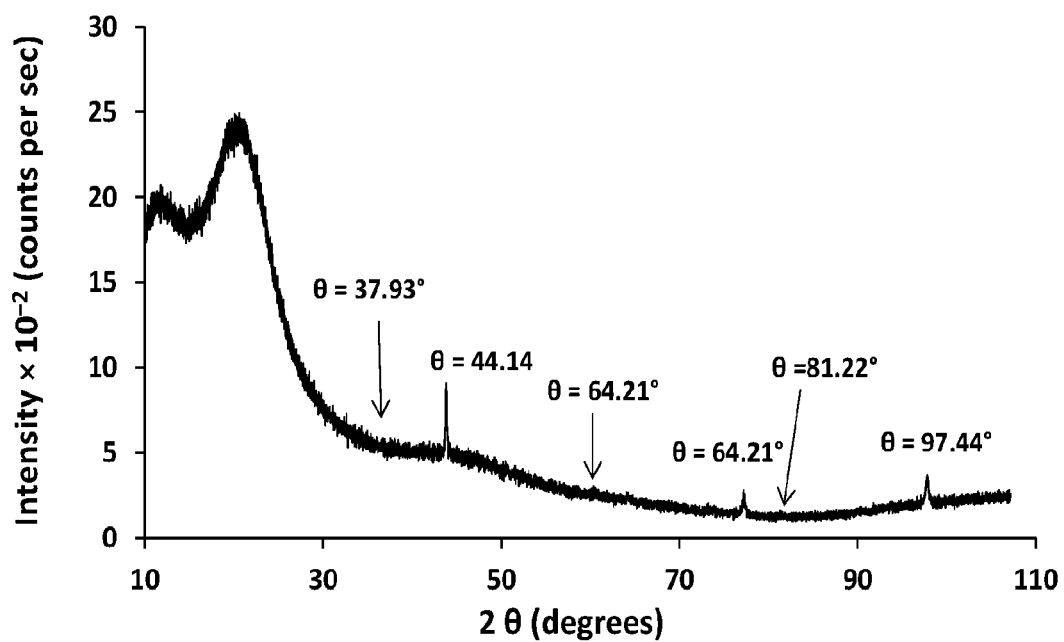
FIG. 6B shows an XRPD obtained under a controlled atmosphere of the lithium precipitate recovered in a glove box. The pattern is observed for LiH in the blue lines.
Figure 7:
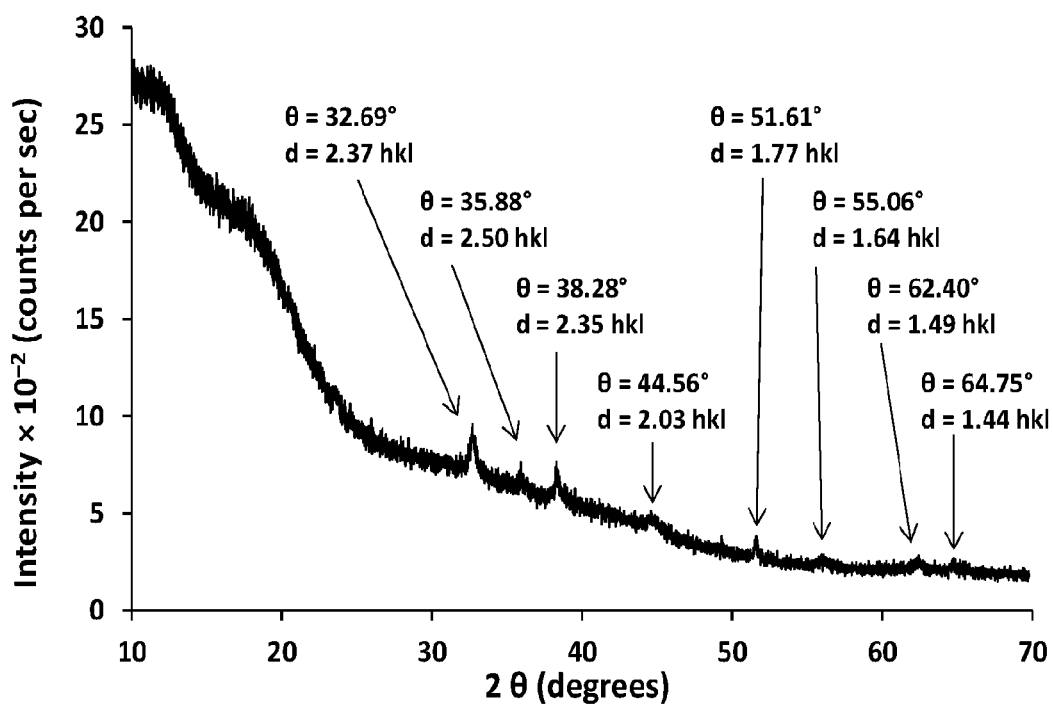
FIG. 7 shows an XRPD of the lithium precipitate recovered in a glove box after exposure to the atmosphere. Patterns are observed for LiH (yellow) and LiOH (green).
Figure 8A:
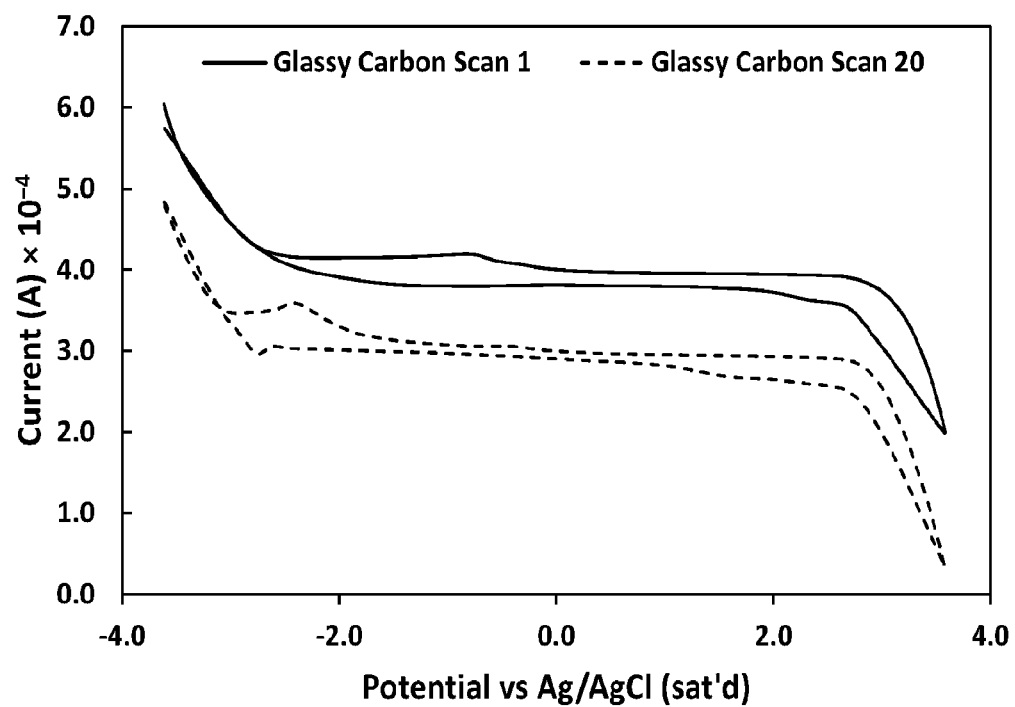
FIG. 8A shows a cyclic voltammogram with a glassy carbon disc working electrode in clean [MPPi][TFSI] (blue tracing) and 0.6 M LiTFSI in [MPPi][TFSI] (red tracing).
Figure 8B:
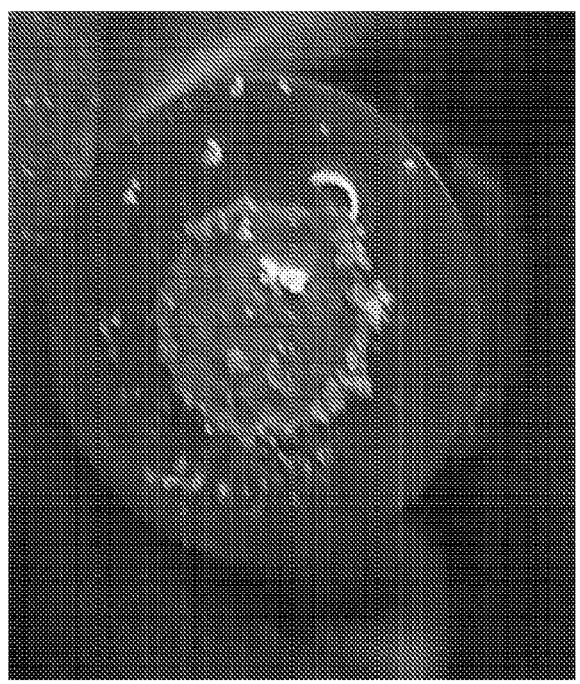
FIG. 8B shows a photograph of lithium recovered after 40 hours at an applied potential of −4.0 V using a glassy carbon electrode.
Figure 9A:
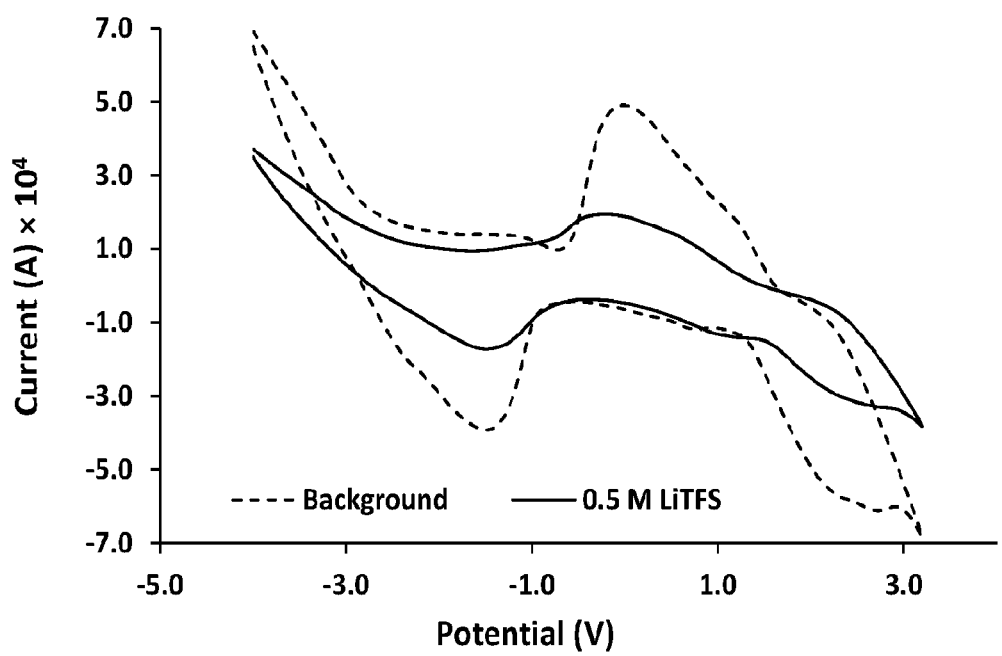
FIG. 9A shows a cyclic voltammogram of the clean [MPPi][TFSI] (red tracing) and 1.0 M LiTFSI (blue tracing).
Figure 9B:
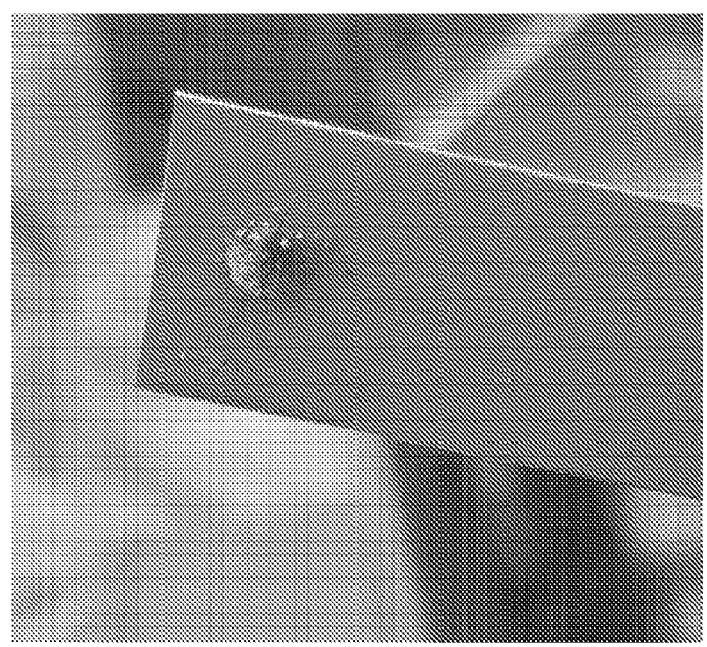
FIG. 9B shows a photograph of carbon paste working electrode with lithium deposits.
Figure 10A:
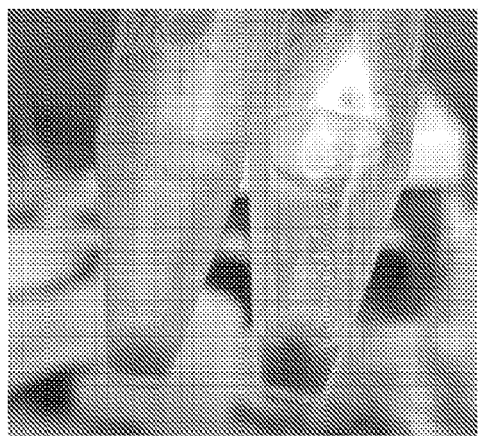
Figure 10B:
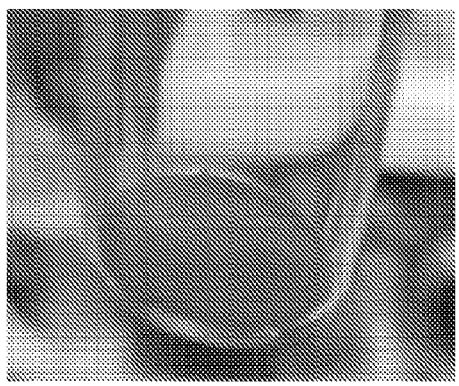
Figure 10C:
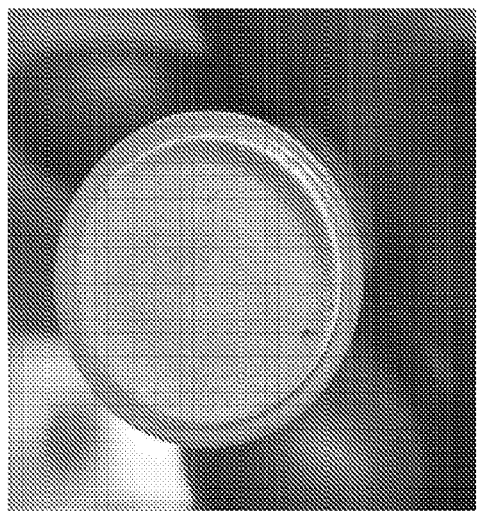

Described herein are methods for recovering lithium metal, lithium hydride, or lithium hydroxide from lithium salts by dissolving the lithium salt in ionic liquids and applying a current to the solution.

The term "lithium salt" refers to any lithium salt, including $Li_2CO_3$, LiCl, $LiPF_6$, $LiBF_4$, $LiClO_4$, $LiAsF_6$, $LiCF_3SO_3$, inter alia, or combinations thereof.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of," and "consisting essentially of" the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For purposes of this disclosure, the chemical elements are identified in accordance with the Periodic Table of the Elements, CAS version, *Handbook of Chemistry and Physics*, 75$^{th}$ ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March, *March's Advanced Organic Chemistry*, 5th ed., John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ ed., Cambridge University Press, Cambridge, 1987; the entire contents of each are incorporated herein by reference.

The term "alkyl," as used herein, means a straight or branched, saturated hydrocarbon chain. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, 4,4-dimethylpentan-2-yl, n-heptyl, n-octyl, n-nonyl, and n-decyl.

The term "substituted" refers to a group that may be further substituted with one or more non-hydrogen substituent groups. For example, alkyl-substituted ammonium cations refer to an ammonium group which may be substituted with at least one alkyl group, as described herein. In some embodiments, a group may be substituted with two alkyl groups, such that it is dialkyl substituted, or four alkyl group, such that it is tetraalkyl substituted.

The term "ionic liquid" or "IL" refers to a salt that melts at a relatively low temperature. An ionic liquid is essentially a salt in the liquid state. Some ionic liquids are room temperature ionic liquids or "RTILs" which indicates they are liquids at room temperature. While ordinary liquids such as water and gasoline are predominantly made of electrically neutral molecules, ionic liquids are largely made of ions and ion pairs (i.e., cations and anions). The physical properties of an IL vary with the identity of the cation/anion species. Any salt that melts without decomposing or vaporizing can usually yield an ionic liquid. Sodium chloride (NaCl), for example, melts at 801° C. (1,474° F.) into a liquid that consists largely of sodium cations ($Na^+$) and chloride anions ($Cl^-$). In some aspects, the ionic liquid comprises an anion selected from the group consisting of n-bis(trifluoromethanesulfonylimide) (TFSI), dicyanomide, acetates, trifluoroacetates, trifluormethylsulfonates, alkyl sulfonates, alkyl sulfates, bis(fluorosulfonyl)imide, trifluoromethylacetate, tetrafluoroborates, hexafluorophosphates, chlorides, and nitrates, inter alia. In some aspects, the ionic liquid comprises a cation selected from the group consisting of tetraalkylammonium cations, a dialkylpiperidinium cation, dialkylpyrrolidinium, carboxy-N,N-trimethylethanamium (Hbet), 1-butyl-1-methylpyrrolidinium (BMPyrr), 1-propyl methylpiperidinium (C3MPIP), 1-butyl-3-methylpiperidinium (C4MPIP), 3-butyl methylimidazolium (BMIM), 3-ethyl-1-methylimidazolium (EMIM), and tri-n-octylmethylammonium (TOMA), inter alia. Exemplary ionic liquids comprise butyltrimethylammonium n-bis(trifluoromethanesulfonylimide); 3-ethyl-1-methylimidazolium acetate; 3-butyl-1-methylimidazolium tetrafluoroborate; 3-butyl-1-methylimidazolium n-bis(trifluoromethanesulfonyl)imide; N-butyl-N-methylpyrrolidinium n-bis(trifluoromethanesulfonyl)imide; 1-methyl-1-propylpiperidinium n-bis(trifluoromethanesulfonylimide); or 1-methyl-1-propylpyrrolidinium n-bis(trifluoromethanesulfonylimide); inter alia.

The term "nonaqueous acid" refers to compounds that are capable of donating protons in ionic liquids to produce an acidic ionic liquid. Exemplary nonaqueous acids comprise bis(trifluoromethanesulfonylimide) acid (HTFSI), methane sulfonic acid (MSA), camphor sulfonic acid (CSA), inter alia.

The term "reductive decomposition" refers generally to the electrochemical stability of solvent molecules, such that at increasingly negative (reducing) potentials the molecules become unstable and decompose. Herein, the solvent molecules are the ionic liquids.

One embodiment describe herein is a method for recovering lithium hydride or lithium hydroxide from a lithium salt composition. In one aspect, the method comprises combining a lithium salt and a nonaqueous acid to form a composition comprising the lithium salt and the nonaqueous acid. In another aspect, an ionic liquid is added to the lithium salt and nonaqueous acid composition, forming an ionic liquid composition. In another aspect, a potential is applied to the ionic liquid composition to deposit lithium onto an electrode.

In one embodiment, the method comprises combining a lithium salt and a nonaqueous acid to form a composition comprising the lithium salt and the nonaqueous acid. The method is summarized by the following reaction using the exemplary species lithium carbonate ($Li_2CO_3$) as the lithium salt and n-bis(trifluoromethanesulfonylimide) acid (HTFSI) as the nonaqueous acid:

In another embodiment, the method may be carried out in at least two means. In one embodiment, the solid lithium salt and solid nonaqueous acid are combined and dissolved directly in the ionic liquid (direct dissolution). In another embodiment, the solid lithium salt and solid nonaqueous acid are combined in deionized water and then dehydrated prior to adding the ionic liquid (indirect dissolution). Each method or means is described as follows.

Direct Dissolution

In one embodiment, the solid lithium salt and solid nonaqueous acid are combined and dissolved directly in the ionic liquid (direct dissolution). This method is summarized by the following Scheme 1 using lithium carbonate and n-bis(trifluoromethanesulfonylimide) acid (HTFSI) as exemplary species:

Scheme 1: Direct Dissolution

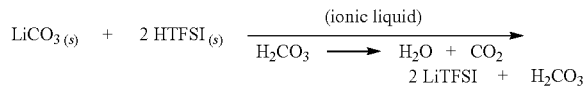

Dehydrate LiTFSI

The ionic liquid may be any combination of cation and anion. The combination of cation and anion may be chosen to influence the properties of the solution as necessary for optimization of the methods described herein. The ionic liquid may be a room temperature ionic liquid (RTIL). RTILs are those liquid at room temperature. RTILs have similar electrochemical properties of other ionic liquids without the need for elevated temperatures, and the large potential window of RTIL solutions is beneficial for electrochemical reduction.

The ionic liquid may be a simple ionic liquid, containing one type of cation with one type of anion. The ionic liquid may be a complex or mixed ionic liquid, containing several types of anions and cations or double salts.

The ionic liquid may comprise an anion with a lone pair of electrons. In some embodiments, the anion is selected from the group consisting of n-bis(trifluoromethanesulfonylimide) (TFSI), dicyanomide, trifluoroacetate, alkyl sulfonates, alkyl sulfates, bis(fluorosulfonyl)imide, and trifluoromethylacetate. In exemplary embodiments, the ionic liquid comprises a n-bis(trifluoromethanesulfonylimide) (TFSI) anion. In some aspects, the anion of the ionic liquid and the anion of the nonaqueous acid comprise the same anionic moiety. In one aspect, the nonaqueous acid is n-bis(trifluoromethanesulfonylimide) acid (HTFSI) and the ionic liquid comprises an n-bis(trifluoromethanesulfonylimide) (TFSI) anion.

In one embodiment, the anion of the ionic liquid and the anion of the nonaqueous acid comprise the same anionic moiety. In one aspect, the nonaqueous acid is n-bis(trifluoromethanesulfonylimide) acid (HTFSI) and the ionic liquid comprises an n-bis(trifluoromethanesulfonylimide) (TFSI) anion.

In one aspect, the ionic liquid is 1-propyl-1-methylpiperidinium n-bis(trifluoromethanesulfonylimide) or [MPPi][TFSI].

The concentration of lithium in the ionic liquid solvent may be less than or equal to 1.0 M, less than or equal to 0.5 M, less than or equal to 0.4 M, less than or equal to 0.3 M, less than or equal to 0.2 M, less than or equal to 0.1 M, less than or equal to 0.01 M or less than or equal to 0.005 M. The concentration of lithium in the ionic liquid solvent may be greater than 0 M, greater than 0.01 M, greater than 0.1 M, greater than 0.5 M, greater than 1 M, greater than 2 M, greater than 3 M, greater than 4 M, greater than 5 M, greater than 6 M, or greater than 7 M. In one aspect, the lithium concentration in the ionic liquid comprises about: 0.1 M, 0.25 M, 0.5 M, 0.75 M, 1.0 M, 1.5 M, 2.0 M, 2.5 M, 3.0 M, 3.5 M, 4.0 M, 4.5 M, 5.0 M, 5.5 M, 6.0 M, 6.5 M, or 7.0 M.

In another aspect, the dehydration is performed by rotary evaporation, lyophilization, sparging, or the like. In one aspect, the dehydration is performed by rotary evaporation or sparging. In one aspect, dehydration is performed by rotary evaporation.

Indirect Dissolution

In another embodiment, the solid lithium salt and solid nonaqueous acid are combined in deionized water and then dehydrated prior to adding the ionic liquid (indirect dissolution). This method is summarized by the following Scheme 2 using lithium carbonate and n-bis(trifluoromethanesulfonylimide) acid (HTFSI) as exemplary species:

Scheme 2: Indirect Dissolution

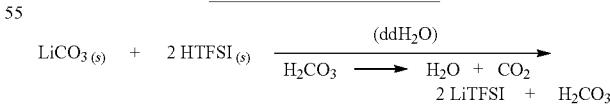

Dehydrate LiTFSI
Dissolve LiHFSI in Ionic Liquid

In one aspect, the dehydration is performed by rotary evaporation, lyophilization, sparging, or the like. In one aspect, the dehydration is performed by rotary evaporation or sparging. In one aspect, dehydration is performed by rotary evaporation. In another aspect, the ionic liquid composition is sparged with an inert gas to remove water and $CO_2$ from the ionic liquid composition. The inert gas is selected from argon, helium, neon, krypton, and xenon. In one aspect, the inert gas is argon.

The ionic liquid may be any combination of cation and anion. The combination of cation and anion may be chosen to influence the properties of the solution as necessary for optimization of the methods described herein. The ionic liquid may be a room temperature ionic liquid (RTIL). RTILs are those liquid at room temperature. RTILs have similar electrochemical properties of other ionic liquids without the need for elevated temperatures, and the large potential window of RTIL solutions is beneficial for electrochemical reduction.

The ionic liquid may be a simple ionic liquid, containing one type of cation with one type of anion. The ionic liquid may be a complex or mixed ionic liquid, containing several types of anions and cations or double salts.

The ionic liquid may comprise an anion with a lone pair of electrons. In some embodiments, the anion is selected from the group consisting of n-bis(trifluoromethanesulfonylimide) (TFSI), dicyanomide, trifluoroacetate, alkyl sulfonates, alkyl sulfates, bis(fluorosulfonyl)imide, and trifluoromethylacetate. In exemplary embodiments, the ionic liquid comprises a n-bis(trifluoromethanesulfonylimide) (TFSI) anion. In some aspects, the anion of the ionic liquid and the anion of the nonaqueous acid comprise the same anionic moiety. In one aspect, the nonaqueous acid is n-bis(trifluoromethanesulfonylimide) acid (HTFSI) and the ionic liquid comprises an n-bis(trifluoromethanesulfonylimide) (TFSI) anion.

In one embodiment, the anion of the ionic liquid and the anion of the nonaqueous acid comprise the same anionic moiety. In one aspect, the nonaqueous acid is n-bis(trifluoromethanesulfonylimide) acid (HTFSI) and the ionic liquid comprises an n-bis(trifluoromethanesulfonylimide) (TFSI) anion.

In one aspect, the ionic liquid is 1-propyl-1-methylpiperidinium n-bis(trifluoromethanesulfonylimide) or [MPPi][TFSI].

The concentration of lithium in the ionic liquid solvent may be less than or equal to 0.5 M, less than or equal to 0.4 M, less than or equal to 0.3 M, less than or equal to 0.2 M, less than or equal to 0.1 M, less than or equal to 0.01 M or less than or equal to 0.005 M. The concentration of lithium in the ionic liquid solvent may be greater than 0 M, greater than 0.1 M, greater than 0.5 M, greater than 1 M, greater than 2 M, greater than 3 M, greater than 4 M, greater than 5 M, greater than 6 M, or greater than 7 M.

Electrodeposition

In another embodiment, lithium metal is recovered from the lithium salts combined with the nonaqueous acids and dissolved in the ionic liquid by applying an electric potential to reduce the lithium ions. An exemplary scheme of the reaction is shown in Scheme 3 where the lithium ion can comprise a lithium ion in an ionic liquid:

Scheme 3: Electrodeposition of Lithium Metal

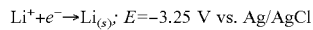

$Li^+ + e^- \rightarrow Li_{(s)}$; $E = -3.25$ V vs. Ag/AgCl

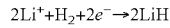

$2Li^+ + H_2 + 2e^- \rightarrow 2LiH$

The stability of the ionic liquid must be appropriate for the electrochemical deposition of lithium. Cations and anions of ionic liquids may undergo decomposition at various potential values. In some embodiments, the ionic liquid comprises a cation that is stable and does not undergo reductive decomposition at a potential between −2.0 V and −4.0 V. The cation may be selected from the group consisting of alkyl-substituted or unsubstituted ammonium cations, alkyl-substituted or unsubstituted piperidinium cations, and alkyl-substituted or unsubstituted pyrrolidinium cations. In some embodiments, the cation is selected from the group consisting of tetraalkylammonium cation, a dialkylpiperidinium cation, and dialkylpyrrolidinium cation. In exemplary embodiments, the ionic liquid comprises a methylpropyl piperidinium cation.

The applied potential may be any potential that allows the deposition of lithium onto an electrode as a metal. The applied potential may be more negative than −2.0 V. The applied potential may be more negative than −2.25 V, −2.5 V, −2.75 V, −3.0 V, −3.25 V, −3.5 V, −3.75 V, or −4.0 V. In some embodiments, the applied potential is pulsed. In some embodiments, the applied potential is constant.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. All methods described herein can be performed in any suitable order unless otherwise indicated herein or otherwise clearly contradicted by context. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

Various embodiments and aspects of the inventions described herein are summarized by the following clauses:

Clause 1. A method for recovering lithium, comprising:
  combining a lithium salt and a nonaqueous acid to form a composition comprising the lithium salt and the nonaqueous acid;
  adding an ionic liquid to the composition to form an ionic liquid composition; and
  applying a potential to the ionic liquid composition to deposit lithium onto an electrode.

Clause 2. The method of clause 1, wherein the lithium salt and the nonaqueous acid are combined in water and then dehydrated prior to adding the ionic liquid.

Clause 3. The method of clause 1 or 2, wherein the ionic liquid composition is sparged with an inert gas to remove water and $CO_2$ from the ionic liquid composition.

Clause 4. The method of clause 3, where the inert gas is selected from argon, helium, neon, krypton, and xenon.

Clause 5. The method of any one of clauses 1-4, wherein the lithium salt is $Li_2CO_3$, LiCl, $LiPF_6$, $LiBF_4$, $LiClO_4$, $LiAsF_6$, or $LiCF_3SO_3$, or combinations thereof.

Clause 6. The method of any one of clauses 1-5, wherein the lithium concentration in the ionic liquid comprises about 0.1 M, 0.25 M, 0.5 M, 0.75 M, 1.0 M, 1.5 M, 2.0 M, 2.5 M, 3.0 M, 3.5 M, 4.0 M, 4.5 M, 5.0 M, 5.5 M, 6.0 M, 6.5 M, or 7.0 M.

Clause 7. The method of any one of clauses 1-6, wherein the anion of the ionic liquid and the anion of the nonaqueous acid comprise the same anionic moiety.

Clause 8. The method of any one of clauses 1-7, wherein the nonaqueous acid is n-bis(trifluoromethanesulfonylimide) acid (HTFSI).

Clause 9. The method of any one of clauses 1-8, wherein the ionic liquid comprises an n-bis(trifluoromethanesulfonylimide) (TFSI) anion.

Clause 10. The method of any one of clauses 1-9, wherein the ionic liquid comprises a cation that does not undergo reductive decomposition at a potential between -2.5 and -4.5 V.

Clause 11. The method of any one of clauses 1-10, wherein the ionic liquid comprises a cation selected from the group consisting of alkyl-substituted or unsubstituted ammonium cations; alkyl-substituted or unsubstituted piperidinium cations; or alkyl-substituted or unsubstituted pyrrolidinium cations.

Clause 12. The method of any one of clauses 1-11, wherein the ionic liquid comprises a cation selected from the group consisting of a tetraalkylammonium cation, a dialkylpiperidinium cation, and a dialkylpyrrolidinium cation.

Clause 13. The method of any one of clauses 1-12, wherein the ionic liquid comprises a cation selected from the group consisting of a butyltrimethylammonium cation; a 1-methyl-1-propylpiperidinium cation, and a 1-methyl-1-propylpyrrolidinium cation.

Clause 14. The method of any one of clauses 1-13, wherein the applied potential is between -3.2 and -4.0 volts.

Clause 15. The method of any one of clauses 1-14, wherein the applied potential is pulsed.

Clause 16. The method of any one of clauses 1-15, wherein the applied potential is constant.

Clause 17. The method of any one of clauses 1-16, wherein the lithium is deposited as lithium metal, lithium hydride, or lithium hydroxide.

Clause 18. The method of any one of clauses 1-17, wherein the electrode comprises carbon or gold.

Clause 19. Lithium metal, lithium hydride, or lithium hydroxide recovered using any of the methods of any one of clauses 1-18.

Clause 20. A means for recovering lithium, the means comprising:

combining a lithium salt and a nonaqueous acid to form a composition comprising the lithium salt and the nonaqueous acid;

adding an ionic liquid to the composition to form an ionic liquid composition; and applying a potential to the ionic liquid composition to deposit lithium onto an electrode.

Clause 21. Lithium metal, lithium hydride, or lithium hydroxide recovered using the means of clause 20.

EXAMPLES

Example 1

Direct Dissolution

In the direct dissolution method, lithium carbonate was dissolved directly into the [MPPi][TFSI] in a 40 mL vial. HTFSI was then added to the vial. A slight excess of $Li_2CO_3$ was used to make sure all of the acid was used. Excess acid can create hydrogen evolution at the electrode while trying to deposit the lithium. The vial was covered with parafilm with several vent holes to allow the escape of carbon dioxide. The mixture was then sonicated until the reaction was completed. This was assumed to have occurred once bubbling ceased. The solution was then evaporated in a rotary evaporator overnight at 45 mbar and 55° C. to remove water absorbed by the [MPPi][TFSI] and created during the dissolution. At 45 mbar, water boils at approximately 30° C.

Example 2

Indirect Dissolution

In the indirect dissolution, the $Li_2CO_3$ and HTFSI were added to water to facilitate the reaction. Again, an excess amount of $Li_2CO_3$ was added to about 20 mL of 18.2 MO water in a round bottom flask. The HTFSI was then added to the water. The solution would be stirred for an hour to allow the reaction to be run to completion. The solution was then filtered to remove any excess undissolved $Li_2CO_3$. The round bottom was placed on a rotary evaporator overnight at 45 mbar and 55° C. to remove the water. Once the water was removed, a solid would form in the round bottom flask as the LiTFSI cooled to room temperature. While under vacuum and heated on a rotary evaporator, the LiTFSI was generally a liquid. From this point, the LiTFSI was placed directly into [MPPi][TFSI] and sonicated to assist in dissolution. The solution was then evaporated again under the same conditions because the LiTFSI is very hygroscopic and additions were completed in the fume hood.

Example 3

Reference Electrodes

Non-aqueous reference electrode kits were purchased through Basi Part number MF-2062. These kits were composed of glass tubes with porous CoralPor® tips (BASI). The wire inside was a silver wire. A silver nitrate solution was made following the method described by Saheb et al., Electroanalysis 18(4): 405-409 (2006). Silver nitrate is not soluble in most ionic liquids. The $AgNO_3$ is initially dissolved in acetonitrile to make a 1.0 M solution. Then 50 µL of the $AgNO_3$ solution was added to 450 µL of the RTIL. The solution was then placed into the reference electrodes and they were closed. The electrodes were allowed to sit overnight to equilibrate. To test the reference electrodes, they were tested with a 2.5 mM ferrocene solution in the same RTIL. The ferrocene does not readily dissolve in an RTIL but will slowly dissolve over the course of a day with stirring. Sonication can also be used but the ferrocene tends to precipitate over the course of a few days. A CV was run between -0.7 V and 0.3 V to identify the $Fc/Fc^+$ couple. All further CVs were adjusted to this scale.

Example 4

Deposition of Lithium

All electrochemical work was completed using a 760C Potentiostat by CH Instruments, Inc. For typical Li depositions, 4 mL of 0.5 M LiTFSI in [MPPi][TFSI] were added to an electrochemical cell. The counter electrode was a platinum sheet and the reference electrode were one as described above. The working electrode changed with the study but ranged from gold, aluminum, and carbon electrodes. The CH Instruments Inc 600 series potentiostats with the corresponding CHI software were used for all deposition studies. Initially studies were completed on the bench top but were later performed in a doublewide MBRAUN glovebox.

Before a deposition was started, a cyclic voltammetry (CV) was completed. It was found that running the CV before the deposition period, increased the deposition significantly. The CV was run from 3.2 V to −4.0 V for 20 cycles at a scan rate of 0.1 V/sec. Once adjusted with the reference electrode, these voltages are 3.57 V and −3.62 V vs Ag/AgCl. This set up took about 45 minutes to complete. Following the completion of the CV the deposition was completed.

When running steady state deposition at one potential the "i-t Amperometric i-t Curve" technique was used in the software. The potential was most often set to −4 V with a 3-second current measurement interval. The runs were generally set to go between 20 and 40 hours. When completing the pulsed deposition, the "Differential Pulse Amperometry" technique was used. The Initial E, Cleaning E, and Cleaning time were all set to zero. In a typical set up, Pulse E1 was −4 V with T1 set to 5 seconds and Pulse E2 was 1 V with 0.5 seconds. The number of cycles was set to 13091 or about 20 hours of run time. Depositions were completed for 40 hours total with images taken at the 20-hour mark.

Dissolutions and depositions were completed in several different ionic liquids all containing the [TFSI] anion. These ionic liquids included, 1-propyl-1-methylpiperidinium bis(trifluoromethylsulfonyl)imide ([MPPi][TFSI]) purchased from Solvionic with 99.5% purity lolitec with 99% purity; butyltrimethylammonium bis(trifluoromethylsulfonyl)imide ([Me3BuN][TFSI]) 99% from lolitec; and 1-propyl-1-methylpyrrolidinium bis(trifluoromethylsulfonyl)imide ([MPPy][TFSI]) 99% from Solvionic. The lithium bis(trifluoromethylsulfonyl)imide (LiTFSI), 98% and bis(trifluoromethylsulfonyl)imide acid (HTFSI), 99% were purchased from Tokyo Chemical Industry.

Example 5

XRPD Data Collection

The X-ray powder diffraction (XRPD) data were collected on a Bruker D8 Advance PXRD. The patterns were collected from 10° to 120° 2θ. The step for a data point was 0.01° 2θ with 0.65 seconds of data collection per point so the data collection was completed over the course of two hours. Peaks were analyzed in the EVA software and pattern fits were completed in Topaz. The stage used for analysis was a silicon low background stage with a dome to protect the sample from atmosphere when necessary.

What is claimed:
1. A method for recovering lithium, comprising:
combining a lithium salt and a nonaqueous acid in water and then dehydrating to form a dehydrated composition comprising the lithium salt and the nonaqueous acid;
sparging an ionic liquid with an inert gas to remove water and $CO_2$ and adding the sparged an ionic liquid to the dehydrated composition comprising the lithium salt and the nonaqueous acid to form an ionic liquid composition; and
applying a potential to the ionic liquid composition to deposit lithium onto an electrode.

2. The method of claim 1, where the inert gas is selected from argon, helium, neon, krypton, and xenon.

3. The method of claim 1, wherein the lithium salt is $Li_2CO_3$, LiCl, $LiPF_6$, $LiBF_4$, $LiClO_4$, $LiAsF_6$, or $LiCF_3SO_3$, or combinations thereof.

4. The method of claim 1, wherein the lithium concentration in the ionic liquid comprises about 0.1 M, 0.25 M, 0.5 M, 0.75 M, 1.0 M, 1.5 M, 2.0 M, 2.5 M, 3.0 M, 3.5 M, 4.0 M, 4.5 M, 5.0 M, 5.5 M, 6.0 M, 6.5 M, or 7.0 M.

5. The method of claim 1, wherein the anion of the ionic liquid and the anion of the nonaqueous acid comprise the same anionic moiety.

6. The method of claim 1, wherein the nonaqueous acid is n-bis(trifluoromethanesulfonylimide) acid (HTFSI).

7. The method of claim 1, wherein the ionic liquid comprises an n-bis(trifluoromethanesulfonylimide) (TFSI) anion.

8. The method of claim 1, wherein the ionic liquid comprises a cation that does not undergo reductive decomposition at a potential between −2.5 and −4.5 V.

9. The method of claim 1, wherein the ionic liquid comprises a cation selected from the group consisting of alkyl-substituted or unsubstituted ammonium cations; alkyl-substituted or unsubstituted piperidinium cations; or alkyl-substituted or unsubstituted pyrrolidinium cations.

10. The method of claim 1, wherein the ionic liquid comprises a cation selected from the group consisting of a tetraalkylammonium cation, a dialkylpiperidinium cation, and a dialkylpyrrolidinium cation.

11. The method of claim 1, wherein the ionic liquid comprises a cation selected from the group consisting of a butyltrimethylammonium cation; a 1-methyl-1-propylpiperidinium cation, and a 1-methyl-1-propylpyrrolidinium cation.

12. The method of claim 1, wherein the applied potential is between −3.2 and −4.0 volts.

13. The method of claim 1, wherein the applied potential is pulsed.

14. The method of claim 1, wherein the applied potential is constant.

15. The method of claim 1, wherein the lithium is deposited as lithium metal, lithium hydride, or lithium hydroxide.

16. The method of claim 1, wherein the electrode comprises carbon or gold.

* * * * *